United States Patent [19]
von Alten

[11] Patent Number: 5,523,910
[45] Date of Patent: Jun. 4, 1996

[54] RECORDING/REPRODUCING DEVICE HAVING A BYPASSING POLE ELECTROMAGNETIC ACTUATOR LATCH OF LOW POWER REQUIREMENT

[75] Inventor: Thomas W. von Alten, Boise, Id.

[73] Assignee: Hewlett-Packard Company, Palo Alto, Calif.

[21] Appl. No.: 236,947

[22] Filed: May 2, 1994

[51] Int. Cl.⁶ ........................................ G11B 5/54
[52] U.S. Cl. ................................ 360/105; 360/106
[58] Field of Search ................................ 360/105, 106; 335/167, 171, 181, 253, 254, 281

[56] References Cited

U.S. PATENT DOCUMENTS

| | | | |
|---|---|---|---|
| 2,241,838 | 5/1941 | Wilson | 200/104 |
| 4,868,695 | 9/1989 | Quatro et al. | 360/105 |
| 4,881,139 | 11/1989 | Hazebrouck | 360/105 |
| 4,903,157 | 2/1990 | Malek | 360/105 |
| 4,989,108 | 1/1991 | Chang | 360/105 |
| 5,041,934 | 8/1991 | Stefansky | 360/106 |
| 5,262,913 | 11/1993 | Stram et al. | 360/105 |
| 5,317,294 | 5/1994 | Vielot | 335/80 |
| 5,319,511 | 6/1994 | Lin | 360/105 |
| 5,414,577 | 5/1995 | Arin et al. | 360/105 |

FOREIGN PATENT DOCUMENTS

| | | | |
|---|---|---|---|
| 0426968 | 1/1992 | Japan | 360/105 |
| 9209077 | 5/1992 | WIPO | 360/106 |

*Primary Examiner*—Stuart S. Levy
*Assistant Examiner*—Brian E. Miller
*Attorney, Agent, or Firm*—E. F. Oberheim

[57] ABSTRACT

A disk drive having an electromagnetically actuated latch mechanism for latching and unlatching the movable actuator of the disk drive. The electromagnetically actuated latch has a magnetic circuit structure including a two legged yoke which mounts a coil. A keeper forming part of a latch lever is pivotally mounted for rotation about an axis located beside the yoke structure. The keeper defines two air gaps with the yoke, a variable reluctance air gap with one leg and a substantially constant reluctance air gap with the other leg. A spring biases the latch lever to latched position. In the latched position of the latch lever, the torque couples acting on the latch lever due to flux coupling of the keeper at the variable reluctance gap and the substantially constant reluctance gap, produce torque couples acting in the same direction on the latch lever, minimizing the current requirement to move the latch lever from latched position to unlatch the actuator. This magnetic gap configuration in the magnetic circuit minimizes reluctance variations in the magnetic circuit and variations in the torque constant between the extremes of angular displacement of the keeper. Integration in a disk drive is accomplished employing increased angular displacement of the latch lever and shorter magnetic and latch moment arms.

11 Claims, 3 Drawing Sheets

RECORDING/REPRODUCING DEVICE HAVING A BYPASSING POLE ELECTROMAGNETIC ACTUATOR LATCH OF LOW POWER REQUIREMENT

RELATED APPLICATION

A co-pending application, Ser. No. 08/236,948 of W. von Alten, Steven M. Johnson and Michael O. King entitled, Dual Gap Electromagnetic Actuator Having A Bypassing Pole Gap And A Variable Pole Gap, filed on the same date as this application and assigned to the assignee of this invention, contains subject matter disclosed in this application.

TECHNICAL FIELD

This invention relates generally to recording/reproducing devices such as disk drives and more in particular to a disk drive comprising a disk assembly and an actuator assembly in which a spring biased electromagnetically operated latch structure of low electric power requirement is employed for latching and releasing the actuator assembly in and from a parked position with respect to the disk assembly.

BACKGROUND OF THE INVENTION

Latching devices for the actuator assemblies of hard disk drives are employed in those drives in which the actuator assembly is moved to a parked position on the disk(s) with the transducer(s) engaging the surface of the respective disks in a landing or parking zone removed from the data fields. The parking zone is usually located adjacent the hub of a disk. In this parking zone position of the actuator assembly, a latch lever of the latching device is biased in a direction to engage and latch the actuator assembly.

These latching devices have taken various forms all of which have had a common goal, namely requiring no electrical power or minimal electrical power for operation. The more common actuator assembly latching devices which latch the actuator assemblies in a transducer parking zone on the disks may be divided into three general classes:

One is the air vane operated type of latch device seen in such U.S. Patents as U.S. Pat. Nos. 4,538,193; 4,647,997; 4,692,829 and 5,036,416.

A second class is the mechanically or magnetically restrained, actuator force released type of latch device. Actuator release occurs when the actuator motor is energized to move the actuator out of parked position. This type of latch device is seen in U.S. Pat. Nos. 4,562,500; 5,003,422; 5,023,736; 5,117,318 and 5,187,627.

A third is the spring engaged electromagnetically released type of latch device represented in such U.S. Patents as U.S. Pat. Nos. 4,796,130; 4,965,684; 5,012,371 and a publication EP-411-552-A.

With regard to the first type of latch device, as disk drives decrease in size, airflow volume rates and air vane areas are reduced to a point where the aerodynamic force acting on the air vane is insufficient to release the latch. Structural fragility is also a problem.

With regard to the second type of latch device, as disk drives decrease in size, the actuator motors are reduced in size and the actuator forces available to release the actuator from the grip of the fixed bias latch diminish. Here, a point is reached where actuator motor forces are insufficient for latch release.

With regard to the third type of latch device, electrical power is required for operating the latch. A fixed latching bias, as by a spring or a permanent magnet, engages the latch lever with the actuator assembly when the actuator assembly is in parked position. In such a design, the coil of the electromagnet is energized to move the latch lever to disengage the actuator assembly. The coil of the electromagnet must remain energized to hold the latch lever in actuator released position throughout the period of operation of the disk drive. This involves a continuous use of electrical power in the disk drive which is undesirable. On the other hand, the electromagnetically operated latch device appears to be the only viable latch device among those considered herein for use in small form factor disk drives, but those disclosed in U.S. Pat. Nos. 4,796,130 and 5,012,371 as well as European Publication EP-411-552-A, while employing electromagnetically actuated latches are not well suited for application in small form factor disk drives.

A latch lever 19 in U.S. Pat. No. 4,796,130 is spring biased to latched position and moves from latched position against a spring bias when the solenoid 21 in energized.

A latch lever 54 in U.S. Pat. No. 5,012,371 is moved between latched and unlatched positions by solenoid 62. Spring biasing of the latch lever 54 in latched position is not mentioned; only that the movable member 70 of the solenoid has two positions.

In publication EP-411-552-A a torsion spring biased lever 7 is rotated by an arm 3a of the rotary actuator upon movement to parked position where the arm 3a is captured. The spring biased armature 5a of a solenoid 6a moves below the distal end of the latch lever 7 to secure a latch lever in latched position. When the solenoid 6a is energized the solenoid armature is withdrawn which releases the lever 7 which is torsion spring biased to released position.

All three of the references aforesaid use linear stroke solenoids and are mechanically unsuited for down sizing for design integration in a disk drive.

In U.S. Pat. No. 4,965,684 one end 104, the armature end, of a pivotally mounted lever 38 confronts the pole end of a solenoid 36 defining a variable gap. The other end, the latch end, of the pivotally lever 38 mounts a pin 96 which engages a notch 98 in the rotary actuator coil housing 42. This latches the actuator in parked position. When the coil of the solenoid 36 is energized the armature 104 is attracted toward the pole end of the solenoid 36 removing the pin 96 from the notch 98, releasing the actuator for movement. Here, again, mechanical complexity negates scaling down of the design.

Another configuration of an electromagnetic latch, for an actuator in a disk drive, comprises a U-shaped yoke which mounts a coil. The ends of the two pole legs of the U-shaped yoke define pole tips., A pivotally mounted latch lever has a pole arm which mounts an armature or keeper. The latch lever is pivotally mounted on a pivot to rotate about an axis centered in a position above the pole tip of a first one of the two pole legs. In this position, the keeper bridges the pole legs, defining a magnetic gap with each of the pole tips, the magnetic gap between the pole tip at the end of the second one of the two pole legs of the yoke and the distal end of the keeper, being a variable length magnetic gap. The latch lever is pivotally mounted to support the keeper for angular movement between a first angular position, with the coil energized, in which the variable length gap is of minimal dimension and a second angular position, namely the spring biased actuator latched position, when the coil is de-energized. In this actuator latched position, the variable length gap is at its maximum dimension.

The larger the length dimension of the variable air gap when the latch lever is in actuator latched position, the higher the reluctance of the magnetic circuit. The latch lever has a latch arm which mounts a latch member. The latch member engages the actuator assembly when the actuator assembly is in parked position. The magnitude of the displacement of the latch member between actuator latched and actuator unlatched positions, to achieve positive actuator latching and unlatching, is a controlling factor in the design of an electromagnetic latch for a disk drive actuator.

This design of an electromagnetic latch is lacking in functional efficiency and effectiveness in at least two respects. The first is that the flux coupling at the magnetic gap at the first leg, being centered on the keeper at the axis of rotation of the latch lever, produces no useful torque about that axis. The second is that, in the actuator latched position of the latch lever, the magnetic gap at the distal end of the keeper is large and the reluctance of the magnetic circuit is high, requiring a high coil current to move the latch lever from the latched position, which is undesirable. Keeping the gap at the distal end of the keeper small, limits angular movement of the latch lever, necessitating a long length of the latch lever of the latch arm to perform the latching function. Making the latch arm of the latch lever longer than the pole arm may provide adequate displacement of the latch member at the end of the latch arm with reduced angular displacement of the latch arm for latching and releasing purposes, but this presents other problems, such as space accommodation, when an attempt is made to scale down the electromagnetic latch for structural integration in small form factor disk drives.

Having the magnetic gap at the distal end of the keeper close to the axis of the latch lever, minimizes the dimension of that magnetic gap in the latched position of the latch lever, but the electromagnetic moment arm, being short requires higher flux densities in the gap at the distal end of the keeper to achieve the required torque for operating the latch lever.

The primary disadvantage of this design is that it is difficult to scale the electromagnetic latch to a smaller disk drive. If the distance of travel of the latch end of the latch lever is fixed, an even greater difference between the electromagnetic moment arm and the latch moment arm is required if the overall size is to be reduced.

A disk drive having a structurally integrated electromagnetic latch is needed in which increased angular displacement of the latch member is achieved in a device of reduced size, in which the magnetic circuit reluctance is low, and in which the variation of the reluctance of the magnetic circuit between latched and unlatched angular positions of the latch lever is minimized, to provide positive latching and unlatching of the disk drive actuator assembly while minimizing operating current requirements.

SUMMARY OF THE INVENTION

A disk drive according to the present invention, embodies a motor powered rotatably mounted disk assembly mounted to the disk drive housing. The disk assembly has at least one disk. A motor powered actuator assembly, either the linear or rotary type, is movably mounted to the housing and supports a transducer for movement to different radial positions with respect to a surface of the disk, including a parked position of the transducer, usually in a location on the disk adjacent the disk hub where the transducer is removed from the data area or zone on the disk. To latch the actuator assembly with the transducer in parked position, an electromagnetic latch is employed. The electromagnetic latch has a yoke and a pivotally mounted latch lever. The latch lever has a pole arm which mounts a keeper, and a latch arm. The keeper forms with the yoke a variable length gap and a bypassing, low reluctance pole gap. The low reluctance pole gap has a substantially constant gap length throughout the range of angular displacement of the keeper by movement of the latch lever. A coil on the yoke produces magnetic flux which is coupled to the keeper across the gaps. This rotates the latch lever to its latch released position in which the length of the variable length gap is minimal or zero. A spring biases the latch lever to a latch engaged position when the coil is de-energized. The latch arm on the latch lever, when the latch lever is in its latch engaged angular position, has a latch member which engages and latches the actuator assembly in parked position. When the coil of the electromagnetic actuator is energized, the actuator lever is moved to its latch released or unlatched angular position, removing the latch member from engagement with the actuator assembly, releasing the actuator assembly for movement.

The latch member on the latch arm of the latch lever may engage the actuator assembly at any convenient location on the actuator. In a rotary actuator assembly, such as that disclosed herein in presenting the best mode for practicing this invention, the rotary actuator is powered by an axial gap actuator motor. The armature of this motor which is attached to the actuator assembly and forms a part of the actuator assembly comprises a flat coil in a coil housing. This armature swings in an arcuate path in a plane between the parallel steel plates of a permanent magnet stator which is secured to the housing. An arcuate peripheral edge of the actuator motor coil housing is provided with an arcuate notch. When the actuator assembly is in parked position this arcuate notch is positioned to be engaged by the latch member on the latch arm of the latch lever when the coil of the electromagnetic latch is de-energized.

BRIEF DESCRIPTION OF THE DRAWINGS

The invention will be better understood by reference to the following descriptive disclosure when considered in conjunction with the accompanying drawings in which.

DETAILED DESCRIPTION OF THE PREFERRED EMBODIMENTS

Figure 1:
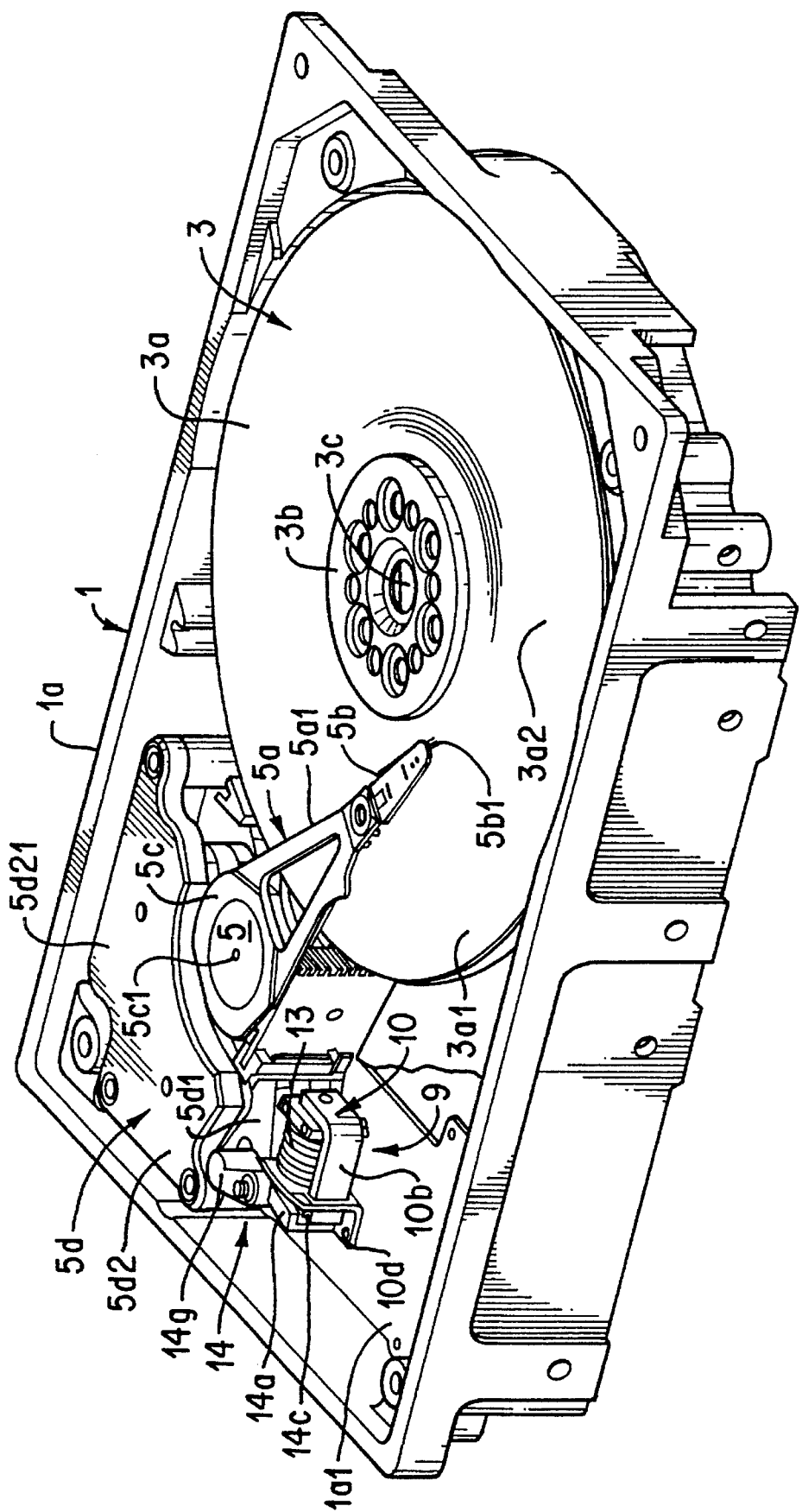
FIG. 1 is an isometric view of a hard disk drive embodying the principles of this invention.

The hard disk drive 1 of FIG. 1 is illustrated without the cover. It comprises a housing 1a which mounts a motor powered rotatable disk assembly 3 and a rotary actuator assembly 5. The disk assembly 3 comprises a disk stack 3a of one or more disks which are mounted upon a hub 3b. The hub 3b is attached to the rotor of the disk motor, not shown in this illustration, which drives the disk assembly for rotation about the hub axis 3c at a constant speed when the disk drive is in operation.

The rotary actuator assembly 5 comprises an actuator bearing housing 5c which rotates about an actuator bearing housing axis 5c1. The actuator bearing housing 5c supports a plurality of individual actuator arms 5a1 which project over respective surfaces of the disks 3a, only one such actuator arm being illustrated. The distal end of each actuator arm 5a1 in this arm stack supports a load beam 5b. A transducer 5b1 which scans the surface of the adjacent disk during operation is gimbal mounted to the distal end of each load beam 5b. During disk rotation at operating speed, the transducers, which comprise individual sliders, fly on the air bearing clinging to and moving with the surface of the disk.

The actuator assembly comprises an axial gap type of actuator motor 5d which comprises an armature 5d1 and a permanent magnet stator assembly 5d2. The actuator motor armature 5d1 is secured to the side of the bearing housing in a circumferential position which is substantially diametrically opposite to the actuator arms 5a1 in the rotary actuator assembly. In this position, the actuator motor armature swings in an arc in a plane between upper and lower steel plates of the permanent magnet stator 5d2 of the axial gap actuator motor 5d, only the upper plate section 5d21 of the permanent magnet stator being visible in FIG. 1.

A controller, not shown in this illustration, as is well known, provides energization for a coil in the armature 5d1 for the purpose of powering the rotary actuator assembly to move the transducer 5d1 to selected, different, radial locations on the disk for reading or writing data on the surface of the disk.

The disk surface is divided into a data zone 3a1 and a landing or parking zone 3a2 where the transducer 5b1 is parked. In the position of the actuator assembly seen in FIG. 1, the transducer 5b1 is positioned in the parking zone 3a2. This is the position of the actuator assembly when the disk drive is not in use. When the disk 3a, is stopped the transducer 5b1 rests upon the surface of the disk in this parking zone 3a2. In this circumstance, it is important that the actuator assembly be secured so that no angular motion can take place which would displace the transducer 5b1 radially of the disk surface, for the purpose of preventing damage to the transducer and to the disk surface.

Figure 2:
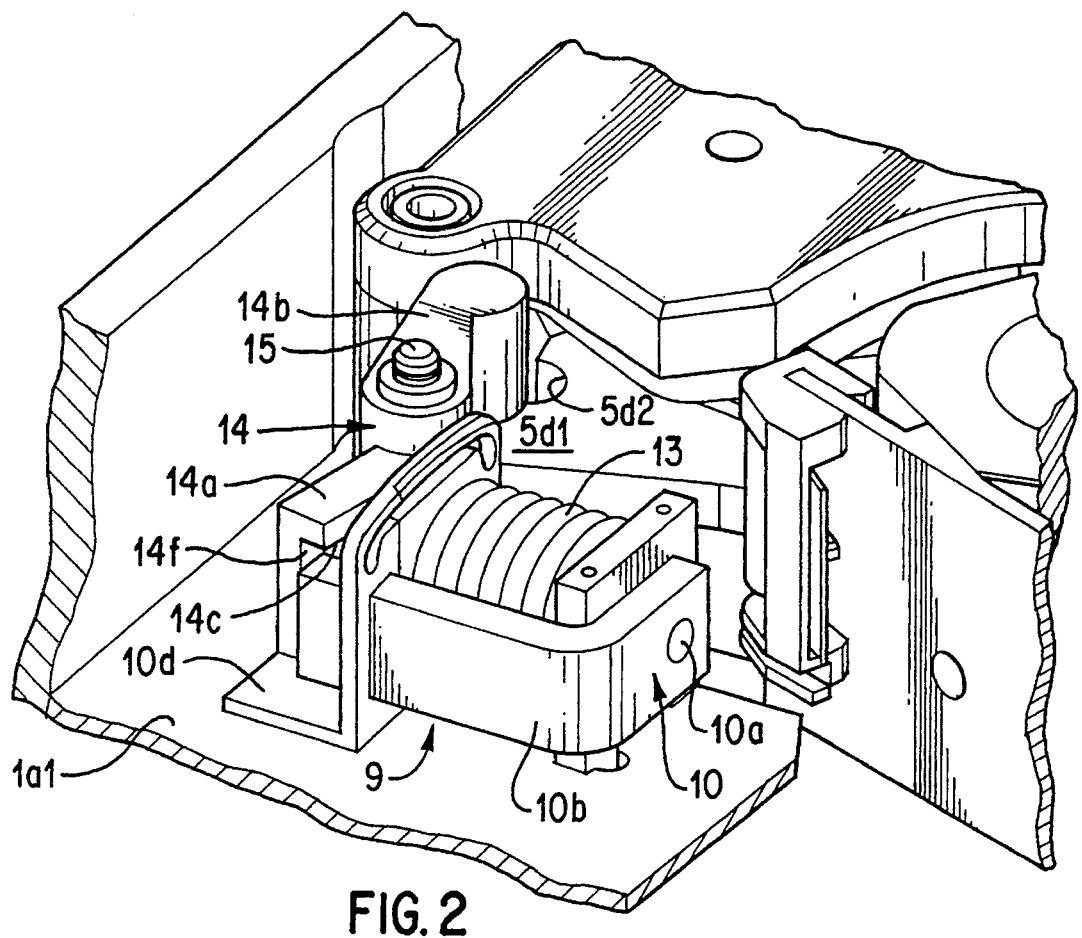
FIG. 2 is an enlarged isometric illustration of a fragmentary portion of the disk drive of FIG. 1 illustrating the details of the actuator latching arrangement.

To this end, an electromagnetically operated latch 9 is employed to latch and secure the actuator assembly with the transducers in the parked position. The electromagnetically operated latch 9, as seen in the drawings, refer now also to FIGS. 2–5, comprises a yoke structure 10 which mounts a coil 13. The yoke structure comprises a pair of pole legs 10a and 10b. A latch lever 14 of non-magnetic material, including plastic materials, is pivotally mounted upon a shaft 15 secured by supports 10d, FIG. 2, on opposite sides of the yoke structure. The support structure on the front side of the electromagnetic latch is not illustrated so that details of the latch structure might be plainly visible. A keeper 14c, FIG. 4, of magnetic material is mounted in a pole arm section 14a of the latch lever 14, in a position defining respective air gaps 18 and 20, FIGS. 4 and 5, with the end face of the pole leg 10a and the side face 10c at the end of the pole leg 10b. The unique gap structures in this electromagnetic device will be described at a later point.

Figure 3:
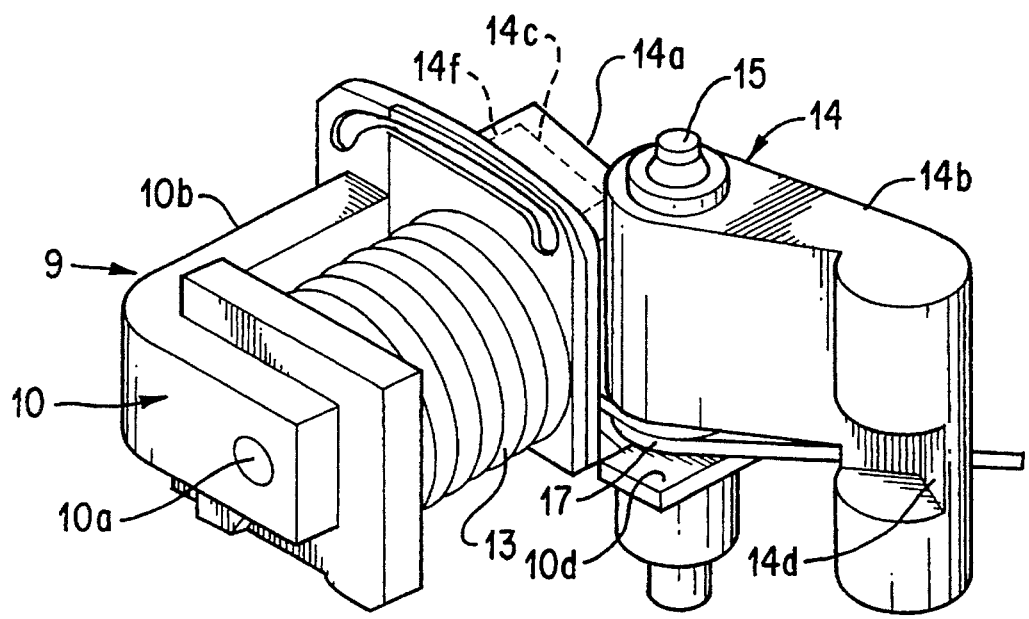
FIG. 3 is an isometric illustration, viewed from a different angle, of the electromagnetic actuator latch per se.
Figure 4:
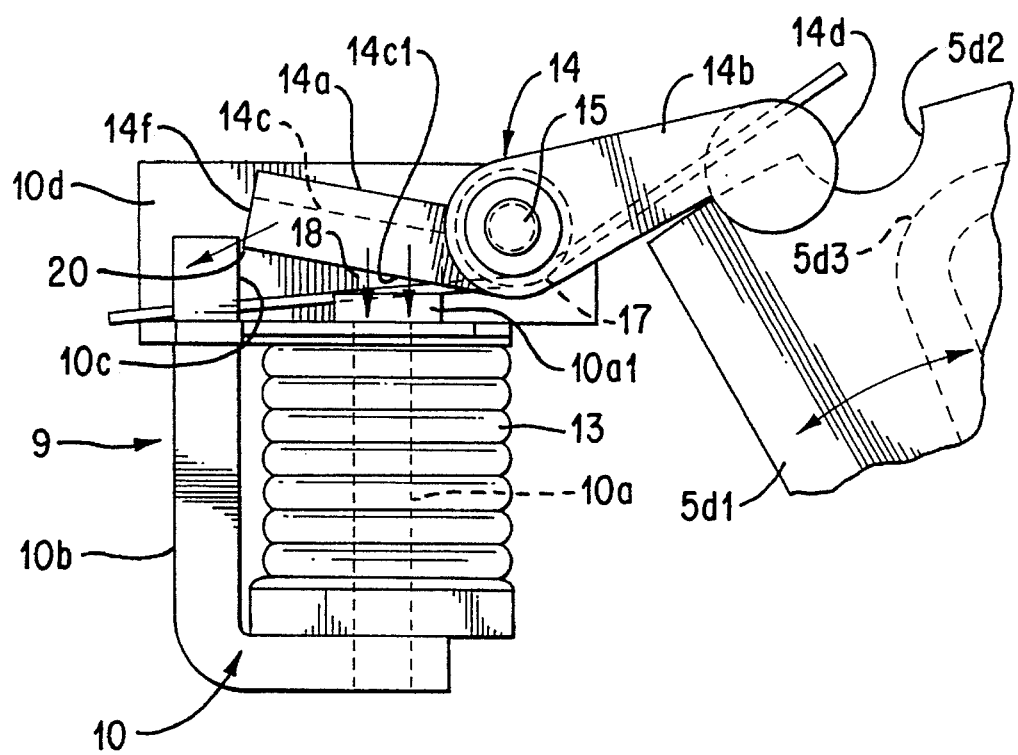
FIGS. 4 and 5 illustrate the relationship of the electromagnetic latch to the armature of the axial gap actuator motor in latched and unlatched positions respectively.
Figure 5:
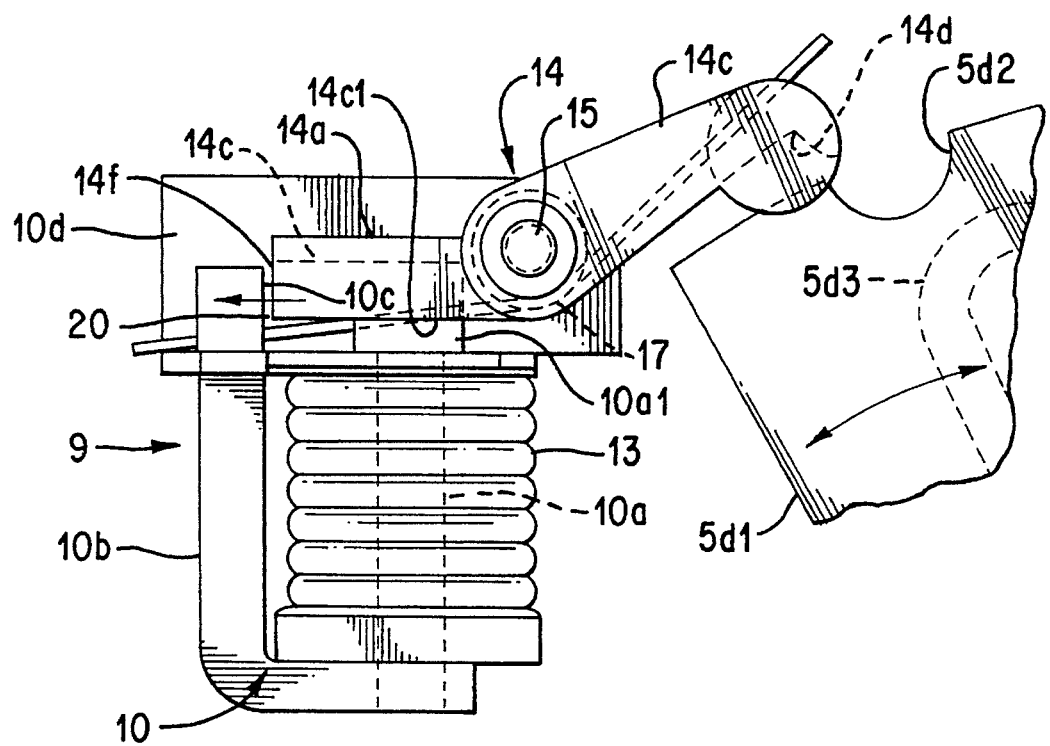

The latch lever 14 comprises a latch arm 14b which has a latch member 14d located at its distal end, see FIGS. 3, 4 and 5. As seen in FIG. 1 and in the enlarged fragmentary view, FIG. 2, the electromagnetic latch 9 is supported on its side on a support 1a1 in the housing of the disk drive by means of the frame section 10d. In this position, the latch arm 14b projects into a position overlapping a peripheral edge of the coil housing of the armature 5d1. This coil housing is provided with an arcuate notch 5d2 in a peripheral edge, which is engaged by the latch member 14d whenever the actuator assembly 5 is in parked position and the coil of the electromagnetic latch is de-energized. In this circumstance, a spring 17 on the electromagnetic actuator, which has a single turn around the pivot 15 and end portions engaging the bracket 10d and the latch arm 14b, biases the latch lever 14 in a clockwise direction around the pivot 15 securely engaging the latch member 14d in the arcuate notch 5d2 of the armature 5d1 of the actuator motor. When the coil 13 of the electromagnetic latch is energized, the magnetic flux linking the keeper 14a across the two magnetic gaps 18 and 20, as best seen in FIG. 4, rotates the latch lever 14 in a counterclockwise direction about the pivot 15 to its latch released or unlatched angular position, as seen in FIG. 5, in which the latch member 14d is clear of the notch 5d2 in the armature housing 5d1 and clear of the peripheral edge of this armature housing 5d1. Thus the actuator assembly 5 is released for angular movement out of the parking zone.

The electromagnetic latch is designed to minimize operational current requirements over the range of angular movement of the keeper 14a and to further minimize operational current requirements in the latch released position. To this end, a magnetic circuit structure is provided having a unique magnetic gap arrangement which avoids large magnetic gaps to thereby reduce magnetic circuit reluctance. By keeping the magnetic circuit reluctance at a minimum, the current requirement for operation is reduced.

In greater detail, as best seen in FIGS. 4 and 5, the two legs 10a and 10b of the electromagnetic latch are of different lengths. The pivot 15 is disposed outside of the yoke structure, to the right and above the short pole leg 10a. The short leg 10a, at its upper end, terminates in a pole tip 10a1, having an end pole face. The long pole leg 10b has a side pole face; 10c which faces in the direction of the short pole leg 10a. The keeper 14c in the lever 14 has a side face 14c1 which confronts the end pole face of the short leg pole tip 10a1, defining therewith a variable gap 18, FIG. 4. This air gap 18, being adjacent the pivot 15, is referred to as the proximal gap. The other end of the keeper 14c, the distal end, has an end face 14f which confronts the side pole face 10c of the long leg 10b, defining a gap 20, called the distal gap, which has a gap dimension which is substantially at a right angle to the gap dimension of the proximal gap 18. The end face 14f of the keeper 14c, upon angular displacement of the latch lever 14 about the pivot 15, is laterally displaced with respect to the side pole face 10c of the long leg 10b. The distal gap 20 thus varies only slightly in length, if at all, with angular movement of the keeper 14a and, therefore, may be kept very small to minimize gap reluctance. This, coupled with a proximal gap 18, having a lesser magnetic moment arm, which minimizes variation of the lenght of the variable gap dimension of the proximal gap, results in a magnetic circuit having minimal magnetic reluctance. Note, that when the coil 13 is energized and the latch lever 14 is moved to its unlatched position, that the side face 14c1 of the keeper 14c seats upon the end pole face of the pole tip 10a1, eliminating the proximal gap 18. The distal gap being small and changing little with angular displacement of the keeper 14a, is of low reluctance in all keeper positions. Thus, the magnetic reluctance of the magnetic circuit is minimal requiring only a small current to secure the keeper 14c and to hold the latch lever in the latch released position shown, to release the actuator assembly 5.

The distal gap 20, although of small dimension in all angular positions of the keeper 14c, one such position being seen in latch released position of FIG. 5, nonetheless has sufficient reluctance to obviate sticking of the keeper 14c to the end pole face of the pole tip 10a1. The end face 14f of the keeper 14c, as the keeper moves toward latched position when the coil is de-energized, is laterally displaced with respect to the side pole face 10c of the long leg 10b, changing very little in the gap length dimension in this movement. The bottom edge of the end face 14f of the keeper 14c, with the latch lever 14 in latched position, FIG. 4, is adjacent the upper edge of the side pole face 10c of the long leg 10b. A slight overlap by the endface 14f of the side pole face 10c is shown, however, the end face 14f may move slightly past this position so that there is no overlap.

Two arrows across the proximal gap 18 indicate the flux coupling and the force acting on the keeper 14c thereat, the magnetic flux density being greater in the smaller dimension of the proximal gap 18. At the distal gap 20, the force acting on the keeper due to magnetic flux coupling thereat is approximately as indicated by the arrow. A component of this force also produces a counter clockwise torque about the pivot 15. Thus, while the forces due to flux coupling at the gaps are not necessarily oriented to produce useful torques throughout the range of angular positions of the keeper 14c, the torque due to magnetic coupling is maximized in the latched position minimizing the current requirement to initiate latch lever movement. As seen in FIG. 5, the force, denoted by the arrow, due to flux coupling at the digital gap 20, produces an opposing torque about the axis of the pivot 15. In this unlatched position of the latch lever 14, however, the torque couple at the distal gap 20 is small and the magnetic circuit reluctance is low enough that the torque couple due to the proximal gap 18, now closed, overwhelms the opposing torque couple due to the distal gap 20. On the other hand the magnetic reluctance of the distal gap 20 is sufficiently high, that when the coil 13 is de-energized the keeper 14c does not stick to the end pole face of the pole tip 10a 1 upon which it is seated.

This unique magnetic gap arrangement comprising a magnetic gap of variable reluctance and a magnetic gap of substantially constant low reluctance in series in the magnetic circuit provides a magnetic circuit in which the magnetic reluctance between and in the extremes of angular displacement of the keeper is minimal and reduces the initial current requirement and other operational current requirements to move the keeper from the latched position to unlatched position and to secure the keeper in unlatched position.

What is claimed is:

1. A recording/reproducing device, comprising:
   a. a support;
   b. a motor powered rotatable disk assembly mounted to said support, said disk assembly having at least one disk;
   c. at least one transducer;
   d. a movable actuator assembly mounted to said support, said movable actuator assembly having an arm with a distal end projecting over a surface of said disk, said transducer being mounted to said distal end of said arm:
   e. an actuator motor having a stator mounted to said support and a motor armature mounted to said actuator assembly, for moving said transducer to different radial locations with respect to said surface of said disk, including a parked position;
   f. an electromagnetic latch mounted to said support, said electromagnetic latch comprising a yoke, a pivotally mounted latch arm having an axis of rotation and an elongated keeper of magnetic material mounted to said latch arm, said yoke having a coil thereon, said yoke having a pair of legs which are spaced apart, one leg having an end pole face and the other leg having a side pole face, said other leg being longer and protruding further than said one leg, said and end pole face being closer to the rotation axis than said side pole face;
   g. said elongated keeper having a side face portion displaced from said axis defining a first gap with said end pole face of said one leg of said pair of legs, said first gap varying in gap dimension in the presence of angular movement of said elongated keeper, and, said elongated keeper having an end face spaced from said side pole face of said other leg of said pair of legs, said end face of said keeper moving laterally of said side pole face in the presence of angular movement of said keeper;
   h. spring means for angularly biasing said latch arm and said keeper about said axis to a latch position;
   i. a latch member mounted to said latch arm in a position displaced from said axis, said latch member engaging and latching said actuator assembly against angular movement when said actuator assembly is in said parked position and said latch arm is in said latch position, energization of said coil moving said elongated keeper and said latch arm to a latch release position disengaging said latch member from said actuator assembly and releasing said actuator assembly for movement.

2. A recording/reproducing device, comprising:
   a. a housing;
   b. a motor powered rotatable disk assembly mounted to said housing, said disk assembly having at least one disk;
   c. at least one disk;
   d. a movable actuator assembly mounted to said housing, said movable actuator assembly having an arm with a distal end projecting over a surface of said disk, said transducer being mounted to said distal end of said arm;
   e. an actuator motor having a stator mounted to said housing and a motor armature mounted to said actuator assembly, for moving said transducer to different radial locations with respect to said surface of said disk, including a parked position;
   f. an electromagnetic latch including a yoke of magnetic material mounted to said housing, said yoke having a short leg and a long leg each leg having an end portion, said long leg having a side pole face, at said end portion of said long leg, facing in the direction of said short leg, said short leg having an end pole face;
   g. said electromagnetic latch further comprising a latch arm having a latch armature of magnetic material mounted thereto, said latch armature having opposite ends, said latch armature having a side face adjacent one end of said opposite ends and an end face at the other end of said opposite ends;
   h. said electromagnetic latch further comprising a support for mounting said latch arm for angular movement about an axis between a first angular position and a second angular position, in said first angular position said latch arm positioning said side face of said latch armature over said end pole face of said short leg defining a short leg magnetic gap, and spacing said end face of said latch armature from said side pole face of said long leg in a position at least partially overlapping said side pole face defining a long leg magnetic gap, movement of said latch arm and latch armature from said first angular position toward said second angular position moving said side pole face of said latch armature toward said end pole face of said short leg and moving said end face of said latch armature laterally of said side pole face of said long leg in a direction to increase the overlap of said side pole face by said end face of said latch armature, said short leg gap being a located between said long leg gap and said axis of said support;

i. spring means for angularly biasing said latch arm about said axis to said first angular position;

j. a latch member mounted to said latch arm in a position displaced from said axis, said latch member engaging and latching said actuator assembly against angular movement when said actuator assembly is in said parked position and said latch arm is in said first angular position, and k. a coil on said yoke, said coil when energized producing magnetic flux in each said short leg and said long leg of said yoke, linking said latch armature across said short leg magnetic gap and across said long leg magnetic gap, attracting said latch armature and moving said latch arm toward said second angular position against the angular bias of said spring means, movement of said latch arm to said second angular position disengaging said latch member from said actuator assembly and releasing said actuator assembly for angular movement.

3. The recording/reproducing device of claim 2, in which:

a. said coil is on said short leg.

4. The recording/reproducing device of claim 2, in which:

a. said yoke is U-shaped.

5. The recording/reproducing device of claim 2, in which:

a. said support comprises a pivot shaft defining said axis.

6. The recording/reproducing device of claim 5, in which:

a. said pivot shaft of said support is disposed outside of said yoke in a position displaced from the end of said short leg.

7. The recording/reproducing device of claim 5, in which:

a. said spring means comprises a spring wire engaging said pivot shaft and having a fixed end on one side of said pivot shaft and a movable end on the other side of said pivot shaft engaging said latch arm for spring biasing said latch arm and said latch armature angularly about said axis of said pivot shaft into said second angular position in the absence of energization of said coil.

8. The recording/reproducing device of claim 7, in which:

a. said engagement of said spring wire with said pivot shaft comprises at least a single turn of said spring wire about said pivot shaft.

9. The recording/reproducing device of claim 2, in which:

a. said at least one disk of said disk assembly comprises a hub, and b. said parked position is adjacent said hub.

10. The recording reproducing device of claim 2, in which:

a. said latch member of said latch arm engages and latches said motor armature of said actuator assembly.

11. The recording/reproducing device of claim 10, in which:

a. said motor armature comprises a coil housing and a coil in said coil housing, and b. said latch member of said latch arm engages said coil housing.

* * * * *